United States Patent [19]
Tsuyuguchi et al.

[11] Patent Number: 5,083,302
[45] Date of Patent: Jan. 21, 1992

[54] OPTICAL TRACKING SERVO APPARATUS

[75] Inventors: Hiroshi Tsuyuguchi; Makoto Syoji, Akikawa; Tsutomu Morita, Mitaka, all of Japan

[73] Assignee: Teac Corporation, Japan

[21] Appl. No.: 247,163

[22] Filed: Sep. 21, 1988

[30] Foreign Application Priority Data

Sep. 24, 1987 [JP] Japan ................. 62-239699

[51] Int. Cl.$^5$ .................. G11B 7/00; G02B 26/08; G02B 7/02
[52] U.S. Cl. .................. 369/44.11; 369/44.15; 369/44.14; 369/44.22; 350/247; 350/6.3; 350/255
[58] Field of Search ............... 369/44.15, 44.22, 44.13, 369/44.16, 44.11, 44.14; 350/255, 6.3, 247, 252

[56] References Cited

U.S. PATENT DOCUMENTS

| | | | |
|---|---|---|---|
| 4,385,373 | 5/1983 | Howe | 369/44.15 |
| 4,443,721 | 4/1984 | Jansen | 369/44.22 |
| 4,545,046 | 10/1985 | Jansen et al. | 369/44.16 |
| 4,616,355 | 10/1986 | Kasahara | 369/44.16 |
| 4,794,581 | 12/1988 | Andersen | 369/44.15 |

Primary Examiner—Roy N. Envall, Jr.
Assistant Examiner—Nabil Hindi
Attorney, Agent, or Firm—Andrus, Sceales, Starke & Sawall

[57] ABSTRACT

A tracking servo apparatus for performing a control so that a light beam is irradiated onto a predetermined track of an information recording surface of a disc shaped recording medium comprising an optical system for focusing the light beam on the information recording surface of the disc shaped recording medium, a holder for holding the optical system, tracking error detection circuit for detecting a tracking error of the light beam irradiated on the information recording surface with respect to the predetermined track by receiving a reflected light of the irradiated light beam that has been reflected from the information recording surface, and outputs an error signal in accordance with the tracking error, and a piezoelectric device which is connected to the holding means, and is deformed when supplied with an amplified voltage of the error signal so as to deflect the holder and thus moves the optical system so that the light beam is irradiated on to the predetermined track of the information recording surface.

6 Claims, 2 Drawing Sheets

OPTICAL TRACKING SERVO APPARATUS

BACKGROUND OF THE INVENTION

The present invention relates to an optical tracking servo apparatus, and particularly relates to an optical tracking servo apparatus constructed so as to perform a tracking control of a light beam irradiated on an information recording surface on a predetermined track of a disc shaped recording medium, by detecting a reflected light from the information recording surface of the disc shaped recording medium.

In the conventional optical magnetic disc apparatus, a light beam is irradiated from a laser diode, passed through a mirror and an objective lens, and is thereby irradiated onto an information recording surface (hereinafter referred to as a recording surface) on a predetermined track of a disc shaped recording medium (hereinafter referred to as a disc). Thereafter, a reflected light of the irradiated light beam is reflected from the recording surface and onto a photodetector. The photodetector may for example have two photodiodes unitarily formed adjacent to one another. The photodetector obtains a tracking error signal based on respective portions of the reflected light incident on the respective photodiodes in accordance with the known push-pull method.

With the optical magnetic disc apparatus, it is necessary to perform a tracking control in order to accurately irradiate the light beam onto a predetermined track of the recording surface of the disc. There are two methods by which such a control can be performed. In a first method, the tracking control is performed by driving the objective lens in the radial direction of the disc in accordance with the tracking error signal. In a second method, the tracking control is performed by driving the semi-transparent mirror which directs the light beam to the objective lens by reflection of the light beam from the laser diode, in accordance with the tracking error signal. In both of the first and second methods, a magnetic coil is conventionally used as an actuator for driving the objective lens and the semi-transparent mirror respectively by electromagnetic force generated in the magnetic coil.

However, with the conventional tracking servo apparatus which uses the magnetic coil as the actuator, there are problems in that the size as well as consumption power of the magnetic coil constituting the actuator is large. Further a magnetic coil for recording is used by the optical magnetic disc apparatus to apply a magnetic field to magnetize the recording surface of the magnetic disc in order to record recording information in digital form. However, there is a problem that when a current is passed through the magnetic coil used as the actuator a magnetic field generated therefrom interferes with the magnetic field applied to the recording surface by the magnetic coil for recording, and therefore a magnetic noise results in the information recorded on the magnetic disc.

Further, a light beam focusing assembly has the objective lens, the magnetic coil as the actuator, and the mirror, and by moving the light beam focusing assembly in the radial direction of the disc, the light beam is irradiated onto a predetermined track. There is a demand to shorten an access time in order to achieve an increased speed by which the focusing assembly is moved for tracking the light beam onto the predetermined track during recording and reproduction, by decreasing the weight and size of the light beam focusing assembly. However, with the conventional tracking servo apparatus, it is difficult to decrease the size of the magnetic coil constituting the actuator within the focusing assembly, and therefore it is difficult to increase the speed of access to a predetermined track during recording and reproduction.

SUMMARY OF THE INVENTION

Accordingly, a general object of the present invention is to provide a novel and useful tracking servo apparatus in which the disadvantages of the conventional tracking servo apparatus have been eliminated.

A more specific object of the present invention is to provide a tracking servo apparatus which does not use a magnetic coil as an actuator for driving an objective lens or a semi-transparent mirror, and thereby enables the size, weight and consumption power of the actuator to be decreased and also eliminates generation of a magnetic noise in recorded information.

A further object of the present invention is to provide a tracking servo apparatus which enables an access time to a predetermined track during recording and reproduction to be decreased so as to realize an increased speed of access during recording and reproduction.

The above objects and features of the present invention can be achieved by a tracking servo apparatus for performing a control so that a light beam is irradiated onto a predetermined track of an information recording surface of a disc shaped recording medium comprising an optical system for focusing the light beam on the information recording surface of the disc shaped recording medium, holding means for holding said optical system, tracking error detection means for detecting a tracking error of the light beam irradiated on said information recording surface with respect to the predetermined track by receiving a reflected light of the irradiated light beam that has been reflected from said information recording surface, and outputs an error signal in accordance with said tracking error, and a piezoelectric device which is connected to said holding means, and is deformed when supplied with an amplified voltage of the error signal so as to deflect said holding means and thus move said optical system so that the light beam is irradiated onto the predetermined track of said information recording surface.

Other objects, features and advantages of the present invention will become apparent from the following detailed description when read in conjunction with the accompanying drawings.

DETAILED DESCRIPTION

Figure 1:
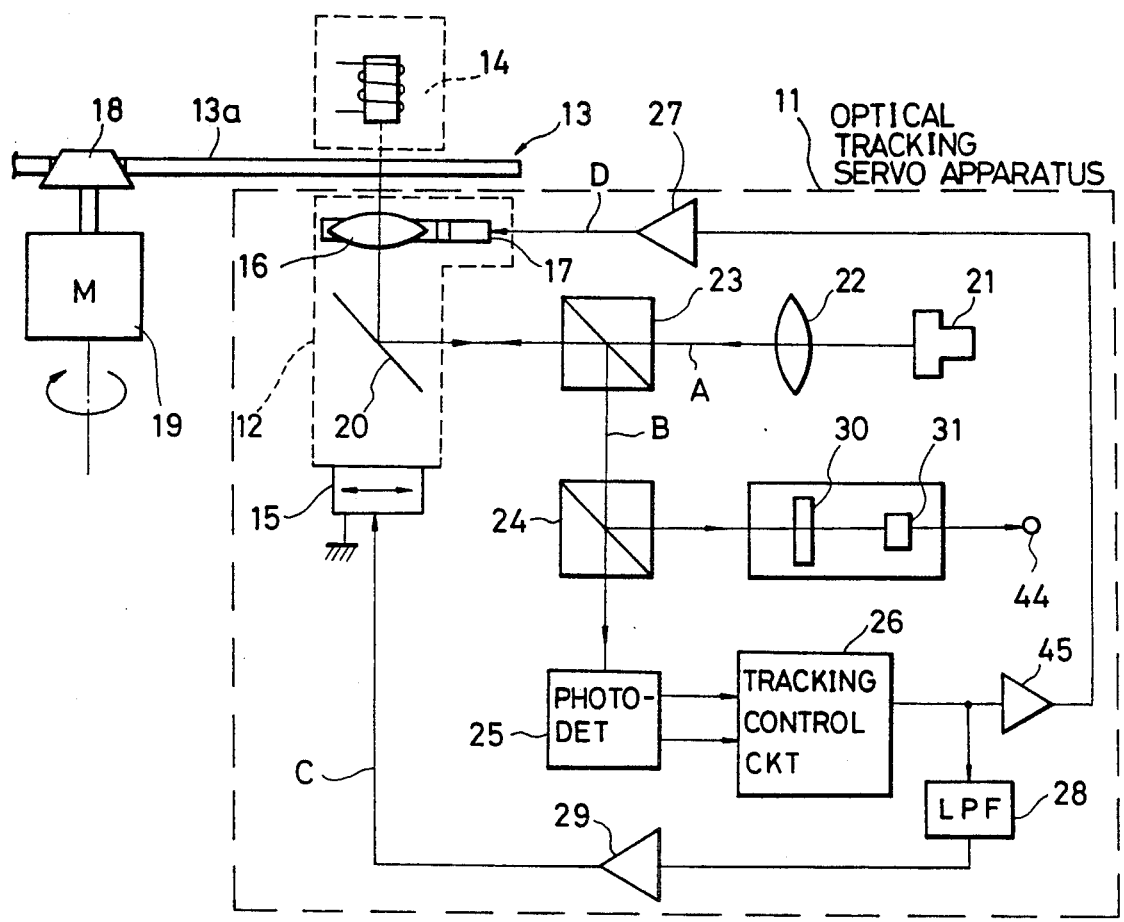
FIG. 1 is a diagram for showing the construction of an embodiment of a tracking servo apparatus according to the present invention.

A description is now given on an embodiment of a tracking servo apparatus of the present invention with reference to FIGS. 1 through 4.

FIGS. 1 through 4 show an embodiment of an optical tracking servo apparatus according to the present invention. In the drawings, a tracking servo apparatus 11 is applied to an optical magnetic disc apparatus for example. A light beam focusing assembly (hereinafter referred to as a focusing assembly) 12 is driven in a radial direction X of a magnetic disc (hereinafter referred to as a disc) 13 in FIG. 3. The optical magnetic disc apparatus performs recording as follows. The optical magnetic disc apparatus applies a magnetic field to a film or layer of magnetic material of a recording surface 13a of the disc 13 by supplying a current to an electromagnet 14, and focuses a light beam on a predetermined guide track (not shown) formed of the recording surface 13a and thus heats a limited area of the recording surface 13a. When the temperature of the limited area of the recording surface 13a increases above a Curie point the magnetism of the magnetic material is erased. Thereafter, when the light beam is moved from the limited area, the temperature of the recording surface 13a at the limited area decreases. When the temperature decreases below the Curie point, the limited area of the recording surface 13a is magnetized in one of two opposing directions by the magnetic field applied from the electromagnet 14 and thus recording information is recorded in digital form on the disc 13. The optical magnetic disc apparatus performs reproduction as follows. The optical magnetic disc apparatus irradiates a light beam having a given plane of polarization onto a portion of a guide track of the recording surface 13a. In correspondence with a so-called Kerr effect, the plane of polarization of reflected light from the recording surface 13a is rotated to a different plane of polarization depending on the direction of magnetization of the portion of the guide track. Thus the optical magnetic disc apparatus reads out the recorded information from the recording surface 13a of the disc 13 by utilizing this effect, that is by detecting the plane of polarization in the reflected light.

A pitch between adjacent guide tracks on the disc 13 is extremely small and is for example 1.6 μm. On account of this, a tracking control of a high precision is necessary when irradiating the light beam onto a predetermined track of the disc 13 during recording and reproduction.

As shown in FIG. 1, the disc 13 is placed on a turntable 18 and is rotated at a constant speed by the turntable 18 which is driven by a motor 19. The focusing assembly 12 is provided at a position opposing a lower surface of the disc 13, and the electromagnet 14 is provided at a position opposing an upper surface of the disc 13.

The focusing assembly 12 has an objective lens 16, an objective lens driving portion 17, and a mirror 20. As will be described later, the objective lens 16 is held by the objective lens driving portion 17 which contains a piezoelectric device which acts as a driver of the objective lens 16.

As shown in FIG. 1, a light beam radiates from a laser diode 21, passes through a collimator lens 22 to form a parallel beam A, and reaches a mirror 20 through a beam splitter 23. The parallel beam A is reflected by the mirror 20 and thus is passed through the objective lens 16. The light beam passed through the objective lens 16 passes through a transparent protective layer (not shown) on the lower side of the disc 13 and is focused on the recording surface 13a by the objective lens 16.

Further, a reflected light B of the light irradiated onto the disc 13 is reflected from recording surface 13a of the disc 13, and reaches the beam splitter 23 after passing through the objective lens 16 and being reflected by the mirror 20. The reflected light B is reflected by the beam splitter 23 and is received by a photodetector 25 by being passed through a beam splitter 24.

In the present embodiment, a push-pull method which is conventionally known is used as a method of detecting a tracking error of the light beam irradiated onto the predetermined track, and two photodiodes unitarily formed adjacent to one another are used as a photodetector 25. According to the push-pull method and this photodetector 25, when the light beam is irradiated so as to be exactly centered on the track, the reflected light B is incident onto the photodetector 25 so that the two unitarily formed photodiodes thereof receive an equal portion of the reflected light, and therefore the two photodiodes output respective currents which are equal to one another. When the light beam deviates to either side of the track, the reflected light B is incident onto the photodetector 25 such that one photodiode of the two unitarily formed photodiodes receives a smaller portion of the reflected light than the other photodiode, and therefore the one photodiode outputs a current which is smaller than a current output by the other photodiode. The currents respectively output from the respective photodiodes are processed and compared so as to produce the tracking error signal.

Figure 2:
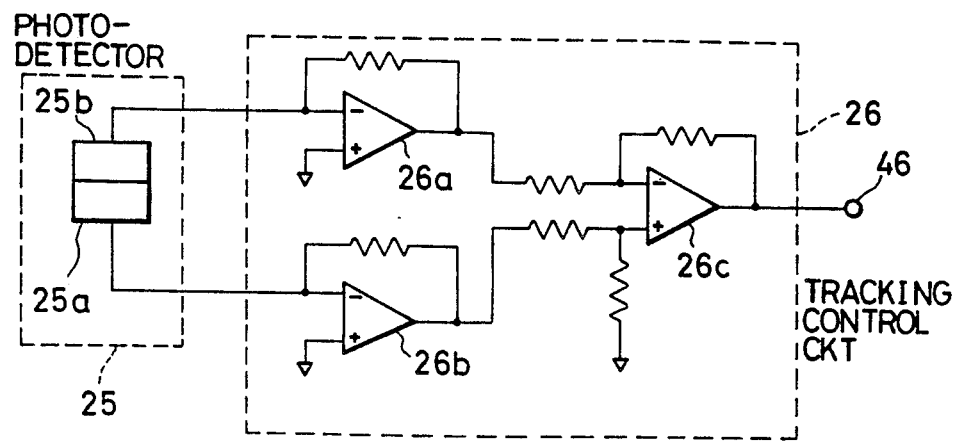
FIG. 2 is circuit diagram of a photodetector and a tracking control circuit in FIG. 1.

FIG. 2 shows a circuit diagram of the photodetector 25 and a tracking control circuit 26 to which the push-pull method is applied. Two photodiodes 25a and 25b of the photodetector 25 receive respective portions of the reflected light incident thereon and based on the amount of the respective portions incident thereon supply respective currents to amplifiers 26a and 26b respectively which convert the respective currents into respective DC voltages. The amplifiers 26a and 26b supply the respective DC voltages to a differential amplifier 26c which amplifies a difference between the two DC voltages and outputs an amplified difference in voltage as the tracking error signal from a terminal 46. The amplifiers 26a and 26b, and the differential amplifier 26c constitute the tracking control circuit 26.

Thereafter, the tracking error signal is supplied to an equalizing amplifier 45 and a low pass filter (hereinafter referred to as LPF) 28. The tracking error signal supplied to the equalizing amplifier 45 is compensated so that the level of the signal output therefrom is the same for a range of frequencies. The signal output from the equalizing amplifier 45 is supplied to a driving circuit 27 where it is amplified and thereafter output as a signal D to a terminal 43 of a piezoelectric device 41 which constitutes a part of the objective lens driving portion 17 in FIG. 3. As will be described later, the objective lens driving portion 17 drives the objective lens 16 in a direction such that the light beam is irradiated onto the middle of the track, responsive to the voltage of the signal D applied from the driving circuit 27 to the piezoelectric device 41. In this manner the light beam is maintained so as to always be irradiated onto the middle of the track.

Figure 3:
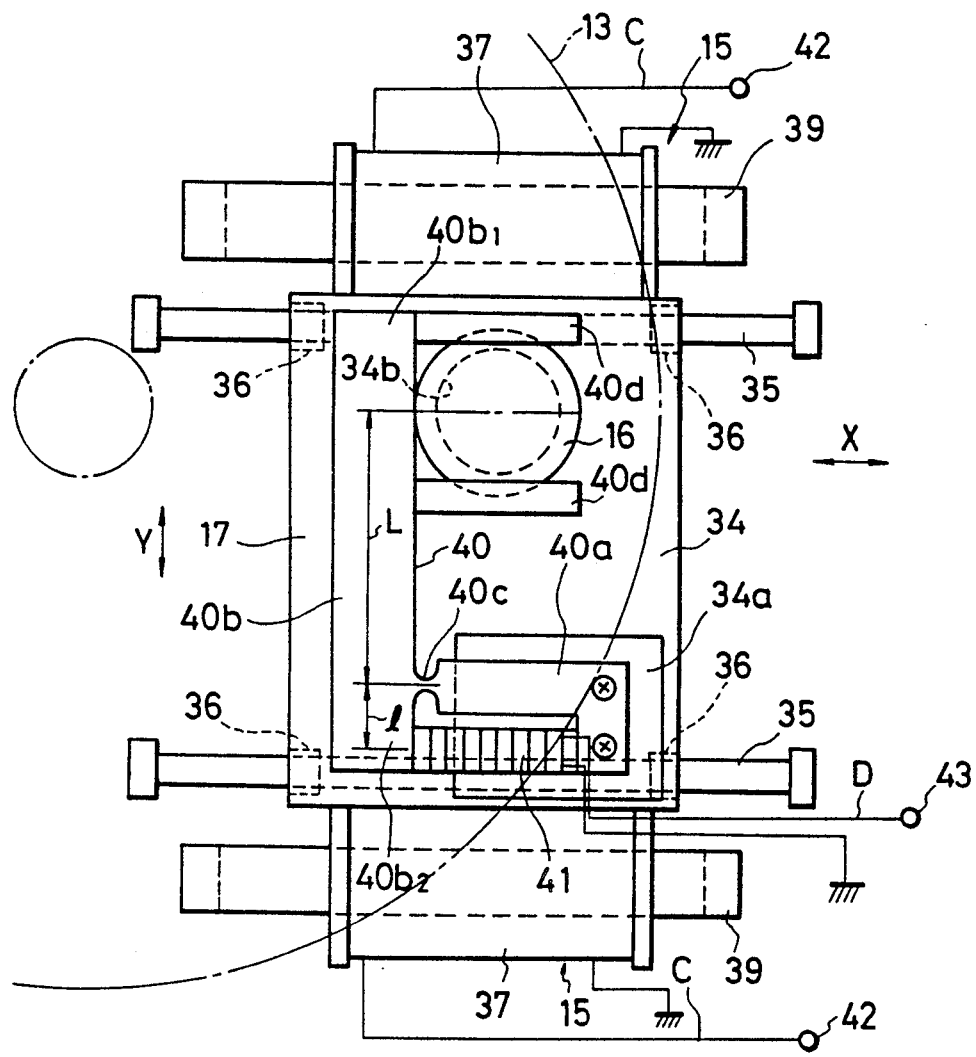
FIG. 3 is a plan view showing the construction of a light beam focusing assembly forming an essential part of the present invention, and a linear motor.

However, a movable range in which the objective lens 17 can be driven due to the piezoelectric device 41 is at the most a distance amounting to 10 to 20 tracks of the disc 13. Further, in order to perform an excellent tracking operation, it is desirable that the objective lens 16 is always maintained in a central region of the moveable range. Accordingly, it is necessary to provide a means which drives the entire focusing assembly 12 in the radial direction of the disc 13. The tracking error signal supplied from the tracking control circuit 26 to the LPF 28 is used for this purpose The LPF 28 outputs a filtered signal of the tracking error signal to a driving circuit 29 where it is amplified and output as a driving current C. As shown in FIG. 3, the driving current C is applied to a terminal 42 which connects with a coil 37. The coil 37 constitutes a portion of a linear motor 15. As a result, responsive to the driving current C, the linear motor 15 drives the entire focusing assembly 12 in a direction X in FIG. 3 so as to always maintain the objective lens 16 in the central region of the moveable range described above.

The reading out of the information recorded on the recording surface 13a of the disc 13 is performed as follows. The reflected light B reflected by the beam splitter 23 reaches a photodetector 31 by being reflected by the beam splitter 24 and being passed through an analyzer 30. The analyzer 30 converts the reflected light incident thereon to a light of an intensity corresponding to the rotation in the plane of polarization of the reflected light caused by the Kerr effect. The photodetector 31 produces a reproducing signal in accordance with the intensity of the light supplied from the analyzer 30. Thus the photodetector 31 outputs the reproducing signal from a terminal 44 in accordance with the signal recorded on a portion of the track of the disc 13.

Next, a detailed description is given on the focusing assembly 12, the objective lens driving portion 17, and the linear motor 15.

Figure 4:
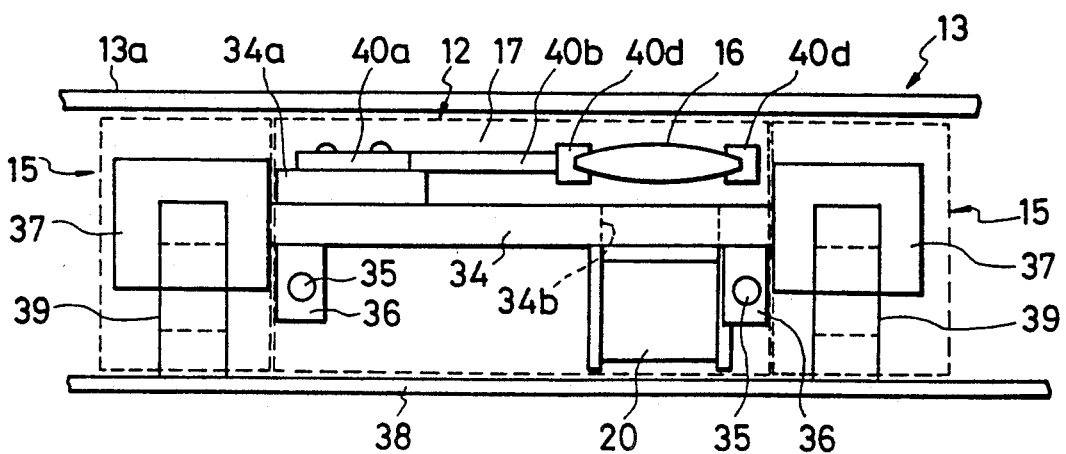
FIG. 4 is an elevational view of the light beam focusing assembly and the linear motor in FIG. 3.

As shown in FIG. 3, the focusing assembly 12 contains the objective lens 16, the objective lens driving portion 17, a base 34, bearing portions 36, and guide shafts 35. The objective lens driving portion 17 is provided on the base 34 of the focusing assembly 12. The bearing portions 36 are formed on four corners at the bottom surface of the base 34. Each of the bearing portions 36 have a hole extending therethrough in the direction X. Two respective pairs of the bearing portions 36 are aligned in the direction X. Further, respective holes of the two respective pairs of the bearing portions 36 are aligned in the direction X so as to slidably receive two respective guide shafts 35 which extend in the direction X. Further, the base 34 of the focusing assembly 12 has the linear motor 15 provided on both sides thereof as shown in FIG. 4. Each of the linear motors 15 is made up of the coil 37 which is fixed on the base 34, and a yoke (permanent magnet) 39. Each of the yokes 39 is slidably inserted through each of the coils 37. The yoke 39 is mounted on a chassis 38 of the optical magnetic disc apparatus, and thus the yoke 39 is a stationary part of the linear motor 12.

Accordingly, when the driving current C is supplied from the driving circuit 29 to the coil 37 through the terminal 42, an electromagnetic force is generated by the coil 37 and thus the base 34 of the focusing assembly 12 is transferred along the pair of guide shafts 35.

The objective lens driving portion 17 has a holding member 40, and a piezoelectric device 41. The holding member 40 for holding the objective lens 16 is made of an elastic material such as aluminum. Further, instead of aluminum, it is possible to use a hard plastic material for the holding member 40. The holding member 40 comprises a fixed portion 40a having an L-shape and which is fixed by screws to a mounting portion 34a formed on the upper surface of the base 34, a rotatable portion 40b which extends in a direction Y which is perpendicular to the direction X which is the direction of tracking, a pivot portion 40c having a small cross-section and which connects between the fixed portion 40a and the rotatable portion 40b, and a pair of arm portions 40d which project in the direction X from a tip portion 40$b_1$ of the rotatable portion 40b.

Respective circumferential portions of the objective lens 16 fit into a groove of the respective arm portions 40d of the holding member 40, and the holding member 40 holds the objective lens 16 a hole 34b formed in the base 34 of the focusing assembly 12. For example, an adhesive may be used to fix the objective lens 16 to the groove of the respective arm portions 40d.

As shown in FIG. 3, the pivot portion 40c of the holding member 40 is located at a distance L in the direction Y away from the centre of the disc, and at a distance l in the direction Y from a longitudinal center line of the piezoelectric device 41. A relationship between the distances L and l is such that the distance L is greater than the distance l. As a result of this construction, the objective lens 16 is held by the holding member 40 which is constructed based on the known lever principle.

The piezoelectric device 41 is provided so as to extend in the direction X in FIG. 3 with one end thereof connected to the fixed portion 40a of the holding member 40 and another end thereof connected to a base portion 40$b_2$ of the rotatable portion 40b. The piezoelectric device 41 is constructed so as to change in length depending on the voltage applied thereto from the driving circuit 27 in FIG. 1 through the terminal 43. Due to the construction of the holding member 40, the change in length of the piezoelectric device 41 causes the rotatable portion 40b to rotate about the pivot portion 40c in accordance with the lever principle so as to result in an increased displacement of the objective lens 16 held at the tip region 40$b_1$ of the holding member 40. Therefore, the objective lens 16 is displaced in the direction X parallel to and in the radial direction of the disc 13. The piezoelectric device 41 may be a multilayer piezoelectric device in which a plurality of piezoelectric elements are unitarily stacked.

A conventional piezoelectric device may be used for this multilayer piezoelectric device. The piezoelectric device 41 comprising the multilayer piezoelectric device has characteristics in that the generation of force in the longitudinal direction is high, its speed of response is high, and its energy conversion ratio for conversion of electrical energy to kinetic energy is high.

Alternatively, a piezoelectric device using multilayer piezoelectric ceramics and which is marketed by Nippon Electric Co, Ltd. (NEC) may be used for the piezoelectric device 41 for example. This device is constructed by printing extremely thin internal electrodes on ceramic sheets, stacking the ceramic sheets on top of one another in the order of several tens to a hundred and several tens of sheets, and firing these stacked ceramic sheets.

When a voltage is applied to the piezoelectric device 41 from the driving circuit 27 through the terminal 43, the piezoelectric device expands or contracts with a high speed of response in accordance with the voltage applied. Because the piezoelectric device 41 is connected between the fixed portion 40a of the holding member 40 and the base portion 40$b_2$ of the rotatable portion 40b as previously described, when the piezoelectric device 41 is deformed so as to expand in the direction X, the rotatable portion 40b rotates in the clockwise direction in FIG. 3 around the pivot portion 40c. Also, when the piezoelectric device 41 is deformed so as to contract in the direction X, the rotatable portion 40b rotates in the anti-clockwise direction.

Further, it is possible for the piezoelectric device 41 to deform by 4 to 16 μm by applying a voltage of 75 to 150 volts thereto, for example. However, such an amount of deformation alone is not sufficient for the movable range of the objective lens 16. For this reason, the holding member 40 is used in order to obtain an increased displacement based on the lever principle. That is, a deformation of the piezoelectric device 41 causes a corresponding displacement of the base portion $40b_2$ of the rotatable portion 40b at the distance l from the pivot portion 40c. Thereby the objective lens 16 located at the tip portion $40b_1$ of the rotatable portion 40b is displaced by an amount L/l times greater than the displacement at the base portion $40b_2$ according to the lever principle. As a result, it is possible for the objective lens 16 to be displaced by 50 to 500 μm through the operation of the objective lens driving portion 17.

By using the piezoelectric device 41 as the driver for displacing the objective lens 16 in the radial direction of the disc 13, it is possible to design the tracking servo apparatus having a lighter weight, a more compact size, and a smaller consumption power than that for the conventional tracking servo apparatus using the electromagnetic coil as the actuator for the objective lens. Accordingly, the operational speed of the tracking servo apparatus 11 at the time when the focusing assembly 12 is driven is increased, and therefore the speed of access for the recording and reproduction is increased.

Further, in the above described embodiment, the tracking control is performed by driving the objective lens 16 in a direction parallel to the disc 13. However, the present invention is not limited to the embodiment described above. Instead, a tracking control may be performed wherein the objective lens 16 is tilted about an axis in the plane of the lens in accordance with the deformation of the piezoelectric device 41. Further, a tracking control may be performed wherein the mirror 20 is transferred in the radial direction of the magnetic disc 13 in accordance with the deformation of the piezoelectric device 41. Further still, a tracking control may be performed wherein the mirror 20 is rotated about a horizontal axis in the plane thereof in accordance with the deformation of the piezoelectric device 41.

The tracking servo apparatus of the present invention has a construction in which the piezoelectric device is used to displace the objective lens when performing the tracking control. As a result, it is possible to decrease the weight, size, and power consumption of the objective lens driving portion of the present invention and also decrease the magnetic noise relative to that when the electromagnetic coil is used as the actuator for driving the objective lens in the conventional case. Therefore, due to the weight reduction of the objective lens driving portion of the focusing assembly, it is possible to decrease the time required for transferring the focusing assembly to a predetermined track when recording and reproducing so as to decrease the access time during recording and reproduction.

Further, in the embodiment described above, a description was given on the tracking servo apparatus applied to the optical magnetic disc apparatus. However the present invention is not limited to the embodiment described above, and the tracking servo apparatus may be applied to an optical magnetic disc reproducing apparatus for reproducing information from the magnetic disc by irradiating a light beam on the disc, or to a WORM (write once read many) type optical magnetic disc recording apparatus in which information can be written in once only but can be read out many times by irradiation of the light beam on the disc.

What is claimed is:

1. A servo tracking apparatus for performing a control so that a light beam is irradiated onto a predetermined track of an information recording surface of a disc shaped recording medium comprising:

an optical system for focusing the light beam on the information recording surface of the disc shaped recording medium;

tracking error detection means for detecting a tracking error of the light beam irradiated on said information recording surface with respect to the predetermined track by receiving a reflected light of the irradiated light beam which has been reflected from said information recording surface, and for outputting en error signal in accordance with said tracking error;

holding means for holding said optical system, said holding means having a lever mechanism and a portion forming a fulcrum for said lever mechanism, said lever mechanism having first and second lever arms extending away from said fulcrum, said first lever arm being coupled to said optical system; and a piezoelectric device which is connected to said second lever arm of said lever mechanism, and which is deformed when supplied with the error signal so as to move said lever mechanism about said fulcrum, thereby to move said optical system so that the light beam is irradiated onto the predetermined track of said information recording surface.

2. A tracking servo apparatus as claimed in claim 1, wherein said optical system comprises an objective lens and a mirror, and either one of said objective lens or said mirror is held by said holding means.

3. A tracking servo apparatus as claimed in claim 1, wherein said holding means is made of aluminum which deflects elastically in response to deformation of said piezoelectric device.

4. A tracking servo apparatus as claimed in claim 1, wherein said holding means is made of a hard plastic which deflects elastically in response to deformation of said piezoelectric device.

5. A tracking servo apparatus as claimed in claim 1, wherein said first lever arm is longer than said second lever arm so that when said piezoelectric device is deformed, said optical system is moved by an amount which is magnified relative to deformation of said piezoelectric device.

6. A tracking servo apparatus as claimed in claim 1, further comprising a parallel transfer means for transferring said optical system, said holding means, and said piezoelectric device in a direction parallel to said disc shaped recording medium.

* * * * *